(No Model.)
H. P. LEONARD.
WIG BLOCK HOLDER.
No. 282,537. Patented Aug. 7, 1883.
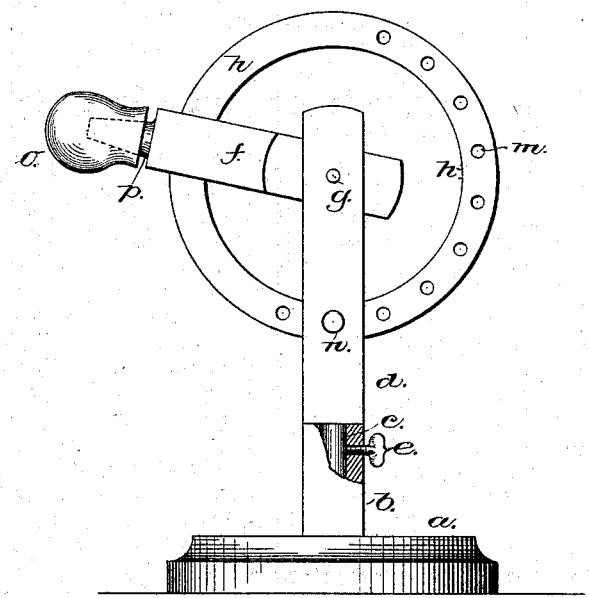
Witnesses.
John F. C. Frinkler
Fred A. Powell
Inventor.
Henry P. Leonard
by Crosby & Gregory
attys.

UNITED STATES PATENT OFFICE.

HENRY P. LEONARD, OF BOSTON, MASSACHUSETTS.

WIG-BLOCK HOLDER.

SPECIFICATION forming part of Letters Patent No. 282,537, dated August 7, 1883.

Application filed December 19, 1882. (No model.)

*To all whom it may concern:*

Be it known that I, HENRY P. LEONARD, of Boston, county of Suffolk, State of Massachusetts, have invented an Improvement in Wig-Block Holders, of which the following description, in connection with the accompanying drawings, is a specification, like letters on the drawings representing like parts.

My invention has for its object the production of a wig-block holder, by which the block may be adjusted into any desired position in front of the operator, in order to present the block and the wig thereon in correct position. The wig-block is herein shown as mounted to revolve on a stud of a jointed arm having an annular or curved guide fitted to a guideway of an upright or standard, which is also made adjustable vertically as well as to turn about its own center.

The drawing represents in side view one of my improved wig-block holders.

The base $a$ has a post, $b$, shown as hollow to receive the stem $c$ of the upright or standard $d$. A thumb-screw, $e$, holds the stem and upright in adjusted position. The upright, near its upper end, has attached to it by pivot $g$ an arm, $f$, provided at its outer end with a pin, $p$, on which is placed the wig-block $o$, the latter being free to be rotated about the said pin. The arm $f$ has connected with it a guide-piece, $h$, made as a circular or curved plate or annulus, adapted to be held in adjusted position by a locking device, $m$, shown as a set-screw.

The operator, when treating the wig on the block $o$, may adjust the latter into any desired position, either by the rotation of the block on the pin $p$ or arm on the standard, or the standard with relation to the post.

The standard and stem, or both, may be bored out or chambered or made hollow for the sake of lightness.

I claim—

The wig-block combined with the arm $f$, on which it may be rotated, and the guide, locking device, and standard, substantially as described.

In testimony whereof I have signed my name to this specification in the presence of two subscribing witnesses.

HENRY P. LEONARD.

Witnesses:
G. W. GREGORY,
B. J. NOYES.